(12) United States Patent
Sugimoto et al.

(10) Patent No.: US 9,987,703 B2
(45) Date of Patent: Jun. 5, 2018

(54) PLASMA SPRAYING APPARATUS

(71) Applicants: FUJI ENGINEERING CO., LTD., Osaka (JP); FUJIGIKEN CO., LTD., Osaka (JP); WEST NIPPON EXPRESSWAY COMPANY LIMITED, Osaka (JP)

(72) Inventors: Masanobu Sugimoto, Osaka (JP); Kenichi Yamada, Fukuoka (JP); Masanobu Irie, Fukuoka (JP)

(73) Assignees: FUJI ENGINEERING CO., LTD., Osaka (JP); FUJIGIKEN CO., LTD., Osaka (JP); WEST NIPPON EXPRESSWAY COMPANY LIMITED, Osaka (JP)

( * ) Notice: Subject to any disclaimer, the term of this patent is extended or adjusted under 35 U.S.C. 154(b) by 1291 days.

(21) Appl. No.: 13/716,757

(22) Filed: Dec. 17, 2012

(65) Prior Publication Data
US 2014/0166625 A1    Jun. 19, 2014

(51) Int. Cl.
B23K 10/00    (2006.01)
B23K 10/02    (2006.01)
B05B 7/22    (2006.01)

(52) U.S. Cl.
CPC .......... B23K 10/027 (2013.01); B05B 7/224 (2013.01)

(58) Field of Classification Search
CPC ........ B23K 10/00; B23K 26/08; B23K 26/34; B05B 7/22; C23C 4/00
USPC ................. 219/75, 121.36–121.59
See application file for complete search history.

(56) References Cited

U.S. PATENT DOCUMENTS

| | | | |
|---|---|---|---|
| 3,676,638 A * | 7/1972 | Stand ....................... | 219/121.47 |
| 4,162,389 A | 7/1979 | Shimdada et al. | |
| 4,762,977 A * | 8/1988 | Browning ................ | 219/121.47 |
| 5,628,924 A * | 5/1997 | Yoshimitsu et al. ....... | 219/121.5 |

(Continued)

FOREIGN PATENT DOCUMENTS

| | | |
|---|---|---|
| JP | 3-68469 | 3/1991 |
| JP | 6-41039 | 6/1994 |

(Continued)

OTHER PUBLICATIONS

English translation of JP H09-308970 to Shimazu published Feb. 12, 1997.*

(Continued)

*Primary Examiner* — Michael Laflame, Jr.
(74) *Attorney, Agent, or Firm* — Wenderoth, Lind & Ponack, L.L.P.

(57) ABSTRACT

The plasma spraying apparatus includes a cathode, a first gas nozzle defining a first gas path between the cathode and itself, a second gas nozzle defining a second gas path between the first gas nozzle and itself, and a third gas nozzle disposed between the first and second gas nozzles to define a third gas path between the first and second gas paths. A wire is disposed at a distal end thereof in front of a nozzle opening of the second gas nozzle. A first gas sprayed through the first gas nozzle is turned into plasma flame, which melts the wire into droplets, and the droplets are sprayed onto a target by a second gas sprayed through the second gas nozzle. The third gas absorbs heat from the plasma flame to thereby turn into a high-temperature gas flow externally of the plasma flame.

13 Claims, 6 Drawing Sheets

(56) References Cited

U.S. PATENT DOCUMENTS

| | | | |
|---|---|---|---|
| 5,808,270 A * | 9/1998 | Marantz et al. | 219/121.47 |
| 6,680,085 B2 * | 1/2004 | Kley | 427/449 |
| 6,744,006 B2 * | 6/2004 | Johnson et al. | 219/121.51 |

FOREIGN PATENT DOCUMENTS

| | | |
|---|---|---|
| JP | 9-308970 | 12/1997 |
| JP | 2000-071076 | 3/2000 |
| JP | 2000-312973 | 11/2000 |
| JP | 2008-229641 | 10/2008 |
| JP | 2008-229705 | 10/2008 |

OTHER PUBLICATIONS

English translation of Japanese Office Action dated Jan. 14, 2014 (OA1) in corresponding Japanese Patent Application P2010-276142.

English translation of Japanese Office Action dated Sep. 2, 2014 (OA2) in corresponding Japanese Patent Application No. P2010-276142.

Chinese Office Action dated Jan. 12, 2015 in corresponding Chinese Patent Application No. 201110409985.X, together with English translation thereof.

Office Action dated Apr. 22, 2016 in corresponding Taiwanese Application No. 100145036, with English translation.

Japanese Office Action dated Oct. 15, 2015 issued in corresponding Japanese Patent Application No. 2014-227290. (with English translation).

* cited by examiner

| CROSS-SECTION OF WIRE PATH | CROSS-SECTIONAL VIEW | DIRECTION OF FORCE | POSITION OF WIRE |
|---|---|---|---|
| CROSS SECTION A |  |  | FIXED |
| CROSS SECTION B |  |  | FIXED |
| CROSS SECTION C |  |  | FIXED |
| CIRCULAR CROSS-SECTION |  |  | NOT FIXED |
| ELONGATED CIRCULAR CROSS-SECTION |  |  | NOT FIXED |

PLASMA SPRAYING APPARATUS

BACKGROUND OF THE INVENTION

Field of the Invention

The invention relates to a plasma spraying apparatus which transfers plasma-arc to an electrically conductive wire to thereby generate plasma flame, melts the wire into droplets, and sprays the droplets onto a target, and further, to a method of forming a sprayed coating onto a target.

Description of the Related Art

FIG. 1 is a cross-sectional view of a conventional plasma spraying apparatus.

As illustrated in FIG. 1, the conventional plasma spraying apparatus 90 includes a first gas nozzle 91 defining a first gas path 91a, a second gas nozzle 92 disposed outside of the first gas nozzle 91 to define a second gas path 92a, a cathode 93 disposed substantially on central axes of both a nozzle opening 91b of the first gas nozzle 91 and a nozzle opening 92a of the second gas nozzle 92, a battery unit 94, and a wire guide hole 95 for introducing an electrically conductive wire W to be sprayed, into a vicinity of the nozzle opening 92a of the second gas nozzle 92.

The wire W is supplied obliquely of a central axis of the nozzle opening 92a and in front of the nozzle opening 92a through the wire guide hole 95. A first gas sprayed through the first gas path 91a is turned into plasma flame F by means of arc generated between the wire W indirectly electrically connected to an anode of the battery unit 94 through the second gas nozzle 92, and the cathode 93 electrically connected to a cathode of the battery unit 94. The thus generated plasma flame F melts the wire W into droplets D, and sprays the droplets D. The droplets D are further reduced in size and further accelerated by a second gas sprayed forwardly of the second gas nozzle 92 through the second gas path 92a, and sprayed onto a target T to thereby form a sprayed coating S on the target T.

In the conventional plasma spraying apparatus 90, the first gas generally comprises an inert gas such as a nitrogen gas and an argon gas, and the second gas generally comprises compressed air, a nitrogen gas or a carbon dioxide gas (for instance, see Japanese Patent Application Publication No. H9 (1997)-308970).

In actual operation of the conventional plasma spraying apparatus 90, the use of a nitrogen gas or a carbon dioxide gas as a second gas increases operation cost, and hence, there is generally used compressed air for reduction of the operation cost. In the plasma spraying apparatus 90, the compressed air used as a second gas surrounds the first gas having been turned into plasma, and thus, it is possible to thin the first gas flow, and further, accomplish a high-speed first gas.

However, since the droplets D derived from the molten wire W are further thinned by the second gas jet, and the droplets D are given a sufficient speed in the conventional plasma spraying apparatus 90, there are generated externally of the plasma flame F because metals to be contained in the sprayed coating S are rapidly restricted during being molten by the compressed air used as a second gas. This results in that the droplets D are oxidized at surfaces thereof, and thus, the sprayed coating S contains therein metal oxide.

SUMMARY OF THE INVENTION

In view of the above-mentioned problem in the conventional plasma spraying apparatus, it is an object of the present invention to provide a plasma spraying apparatus which is capable of reducing oxidation at surfaces of droplets to thereby form a sprayed coating containing oxide in a less amount.

It is further an object of the present invention to provide a method of forming a sprayed coating onto a target, which is capable of doing the same.

In one aspect of the present invention, there is provided a plasma spraying apparatus including a cathode, a first gas nozzle surrounding a head of the cathode therewith to form a first gas path between the cathode and the first gas nozzle, a second gas nozzle surrounding the first gas nozzle therewith to form a second gas path between the first gas nozzle and the second gas nozzle, and a third gas nozzle disposed between the first gas nozzle and the second gas nozzle to define a third gas path between the first gas path and the second gas path, wherein a first gas sprayed through the first gas nozzle is turned into plasma flame by arc generated between the cathode and a wire disposed in front of a nozzle opening of the second gas nozzle, the wire is molten at a distal end thereof into droplets by the plasma flame, and the droplets are sprayed onto a target by means of both the plasma flame and a second gas sprayed through the second gas nozzle, and a third gas sprayed through the third gas nozzle absorbs heat from the plasma flame to thereby turn into a high-temperature gas flow externally of the plasma flame.

In the plasma spraying apparatus in accordance with the present invention, the third gas sprayed through the third gas path disposed between the first gas path and the second gas path absorbs heat from the plasma flame, and produces a high-temperature gas flow therein. The thus produced high-temperature gas flow suppresses turbulence generated externally of the plasma flame as a result that the second gas sprayed externally of the high-temperature gas flow is rapidly restricted, and thereby prevents the plasma flame from dispersing. This ensures reduction in oxidation at surfaces of the droplets.

In the plasma spraying apparatus in accordance with the present invention, it is preferable that the second gas nozzle is formed with a wire path through which a wire is inserted such that a distal end of the wire is disposed in front of a nozzle opening of the second gas nozzle.

In the plasma spraying apparatus in accordance with the present invention, it is preferable that the third gas has a flow rate in the range of 20% to 50% both inclusive in volume relative to a flow rate of the first gas, and further, 5% to 10% both inclusive in volume relative to a flow rate of the second gas.

The third gas may comprise compressed air or a carbon dioxide gas. It is preferable that the third gas comprises an inert gas such as an argon gas or a nitrogen gas. In the case that there is used an inert gas as the third gas, turbulence generated externally of the plasma flame as a result that the second gas is rapidly restricted can be prevented, and further, a high-temperature inert gas jet absorbing heat from the plasma flame is generated externally of the plasma flame. Thus, the droplets are thinned and accelerated in the high-temperature inert gas jet, and thus, protected from being oxidized due to the second gas.

The first gas may comprise compressed air. In the plasma spraying apparatus in accordance with the present invention, even if the first gas comprises compressed air, it is possible to form a less oxidized sprayed coating. In the case that compressed air is used as the first gas, the first gas contains oxygen at about 20%. However, since it is said that a gas having been turned into plasma is small in a function to oxidize molten metal, even if compressed air is used as the first gas, a sprayed coating must be less oxidized.

However, if the plasma flame were made turbulent due to rapid restriction of the second gas in the conventional plasma spraying apparatus, the droplets were oxidized too much, and hence, a sprayed coating would have a deteriorated quality, if compressed air were used as the first gas.

In contrast, in the plasma spraying apparatus in accordance with the present invention, the third gas absorbs heat from the plasma flame to thereby generate a high-temperature gas jet externally of the plasma flame. The thus generated high-temperature gas jet prevents turbulence of the plasma flame caused by the rapid restriction of the second gas, and accordingly, it is possible to form a less oxidized sprayed coating, even if compressed air is used as the first gas.

In another aspect of the present invention, there is provided a method of forming a sprayed coating onto a target, including setting a wire, turning a first gas into plasma flame and causing the plasma flame to flow towards the wire such that a distal end of the wire is molten into droplets, causing a second gas to flow such that the droplets are sprayed onto a target by the second gas, and causing a third gas to flow between the first gas and the second gas to absorb heat from the plasma flame to thereby turn into a high-temperature gas flow externally of the plasma flame.

The advantages obtained by the aforementioned present invention will be described hereinbelow.

Firstly, the plasma spraying apparatus in accordance with the present invention is designed to include the third gas nozzle disposed between the first gas nozzle and the second gas nozzle to define a third gas path through which a third gas is sprayed. The third gas absorbs heat from the plasma flame to thereby turn into a high-temperature gas flow externally of the plasma flame. The thus generated high-temperature gas flow prevents the plasma flame from dispersing, and reduces oxidation of the droplets at surfaces thereof, ensuring it possible to form a less oxidized sprayed coating.

Secondly, in the case that there is used an inert gas as the third gas, a high-temperature inert gas jet absorbing heat from the plasma flame is generated externally of the plasma flame. Thus, the droplets are thinned and accelerated in the high-temperature inert gas jet, and thus, protected from being oxidized due to the second gas. This ensures it possible to form a sprayed coating containing oxides at a less amount.

Thirdly, even if compressed air is used as the first gas, the third gas absorbs heat from the plasma flame to thereby generate a high-temperature gas jet externally of the plasma flame. The thus generated high-temperature gas jet prevents turbulence of the plasma flame caused by the rapid restriction of the second gas, and accordingly, it is possible to form a less oxidized sprayed coating, The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENT

Figure 1:
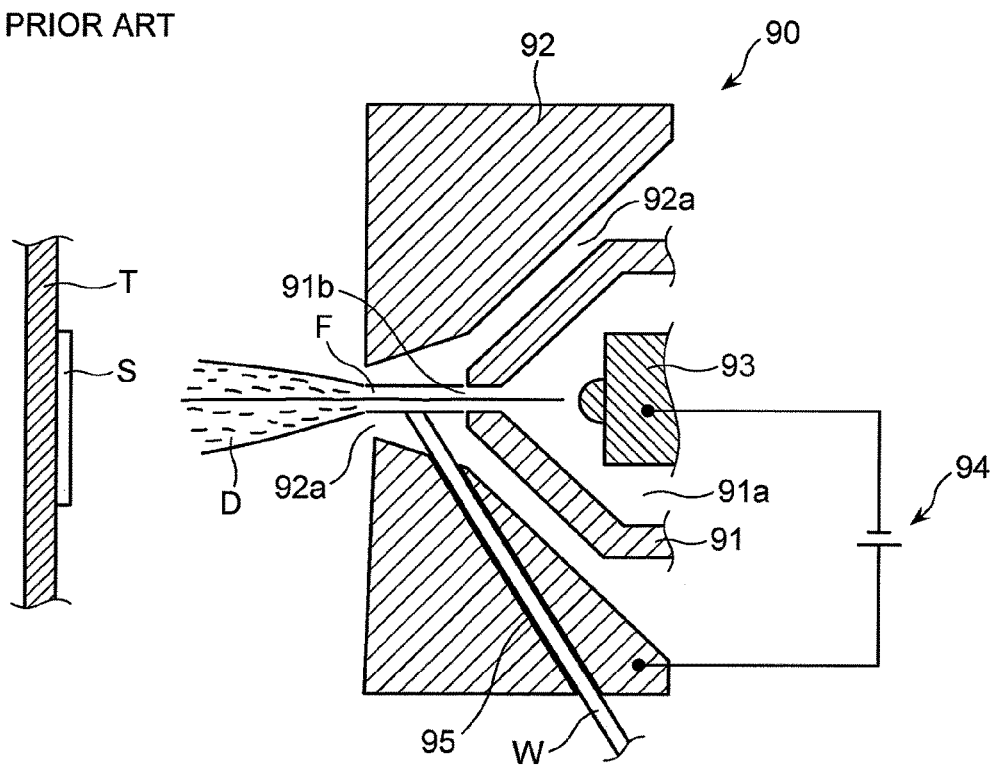
FIG. 1 is a cross-sectional view of a conventional plasma spraying apparatus.
Figure 2:
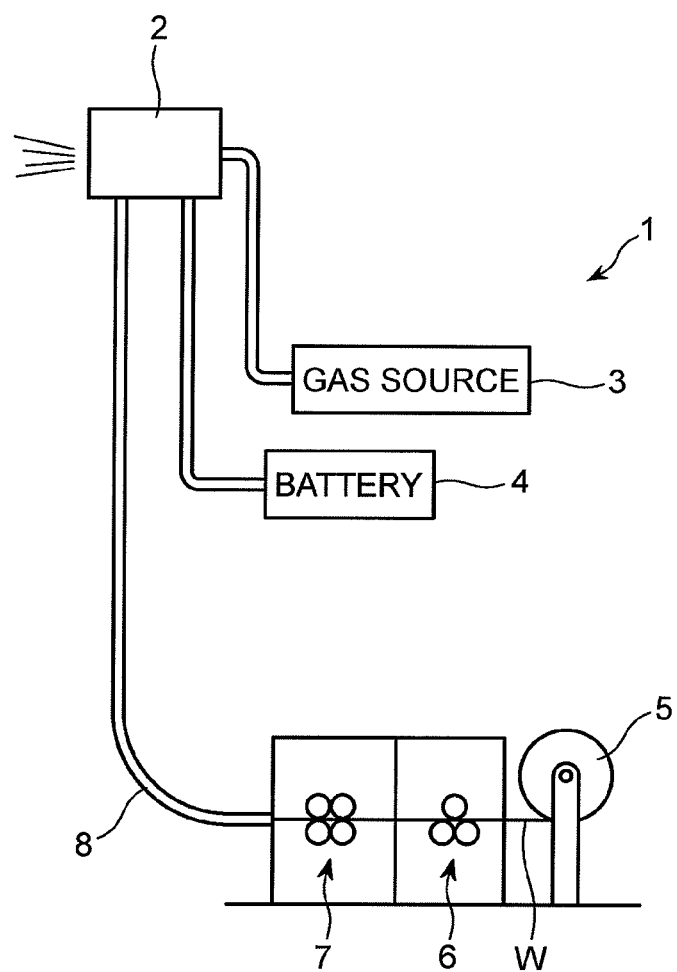
FIG. 2 is a schematic view of the plasma spraying apparatus in accordance with the preferred embodiment of the present invention.
Figure 3:
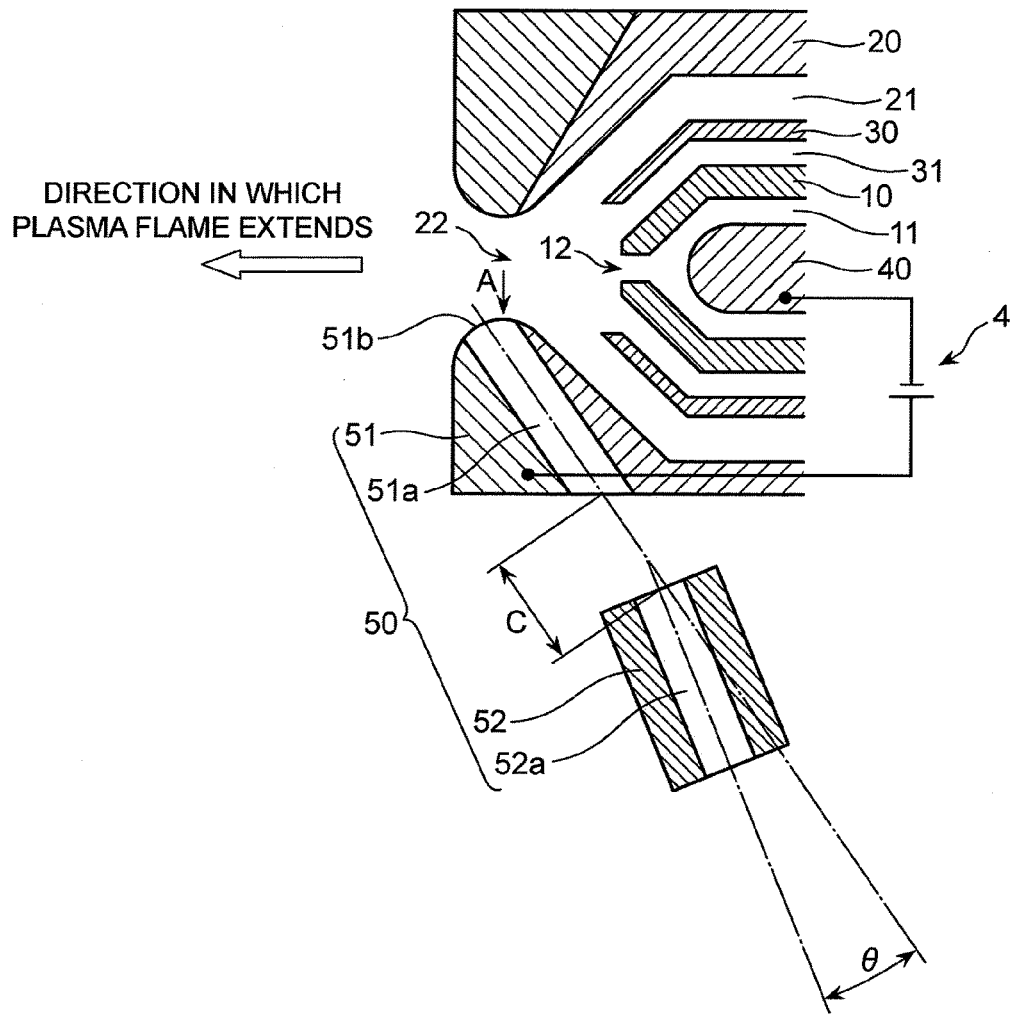
FIG. 3 is a longitudinal cross-sectional view of a main part of a plasma spraying torch illustrated in FIG. 2.
Figure 4:
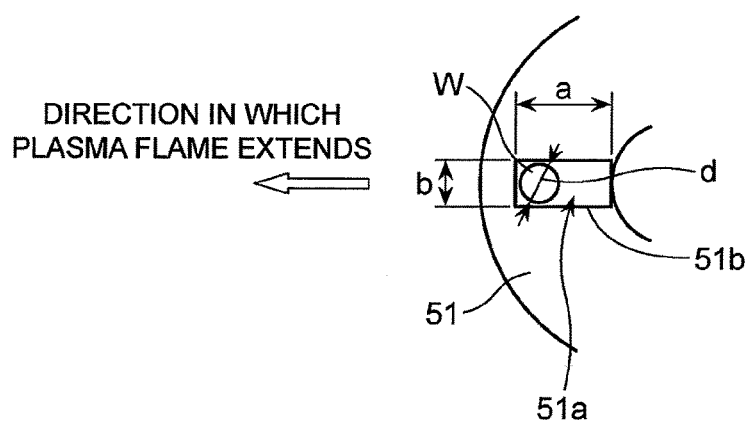
FIG. 4 is an enlarged view seen from an arrow A shown in FIG. 3.
Figure 5:
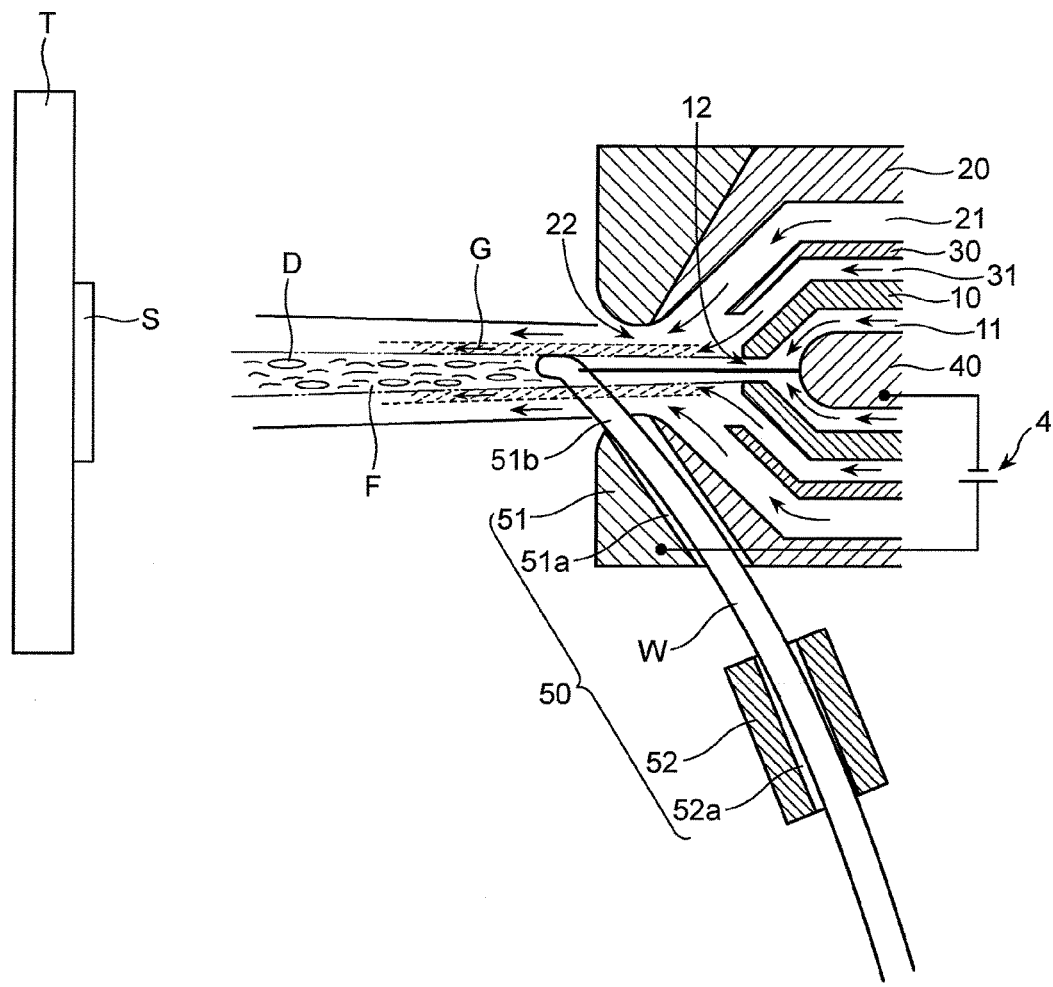
FIG. 5 is a view showing the action of the plasma spraying torch illustrated in FIG. 3.

FIG. 2 is schematic view of the plasma spraying apparatus in accordance with the preferred embodiment of the present invention, FIG. 3 is a longitudinal cross-sectional view of a main part of a plasma spraying torch illustrated in FIG. 2, FIG. 4 is an enlarged view seen from an arrow A shown in FIG. 3, and FIG. 5 is a view showing the action of the plasma spraying torch illustrated in FIG. 3.

As illustrated in FIG. 2, the plasma spraying apparatus 1 in accordance with the preferred embodiment of the present invention includes a plasma spraying torch 2 for spraying droplets generated by melting a wire W by means of plasma flame, onto a target, a gas source 3 for supplying a first gas and a second gas to the plasma spraying torch 2, a battery 4 for supplying electric power to the plasma spraying torch 2, a wire reel 5 around which a wire W is wound, a wire straightener 6 for straightening the wire W unwound from the wire reel 5, and a wire feeder 7 for feeding the wire W to the plasma spraying torch 2 through a wire-feeding tube 8.

As illustrated in FIG. 3, the plasma spraying torch 2 includes a first gas nozzle 10 defining a first gas path 11, a second gas nozzle 20 disposed outside of the first gas nozzle 10 and defining a second gas path 21, a third gas nozzle 30 disposed between the first gas nozzle 10 and the second gas nozzle 20 and defining a third gas path 31, a cathode 40 disposed substantially on central axes of both a nozzle opening 12 of the first gas nozzle 10 and a nozzle opening 22 of the second gas nozzle 20, and a wire path 50 for feeding a wire W to be sprayed, into a vicinity of the nozzle opening 22 of the second gas nozzle 20.

The first gas nozzle 10 surrounds a head of the cathode 40 such that the first gas path 11 is defined between the first gas nozzle 10 and the cathode 40. A first gas to be supplied into the first gas path 11 generates plasma flame for melting a tip end of the wire W into droplets. The first gas comprises an inert gas such as a nitrogen gas or an argon gas. As an alternative, compressed air may be used as the first gas. The first gas is supplied through the first gas path 11, circling around the cathode 40, and is sprayed through the nozzle opening 12 of the first gas nozzle 10 towards the nozzle opening 22 of the second gas nozzle 20.

The third gas nozzle 30 surrounds the first gas nozzle 10 such that the third gas path 31 is defined between the first gas nozzle 10 and the third gas nozzle 30. A third gas to be supplied into the third gas path 31 absorbs heat from the plasma flame to thereby generate a high-temperature gas jet externally of the plasma flame derived from the first gas. The third gas comprises compressed air or a carbon dioxide gas, for instance.

The second gas nozzle 20 surrounds the third gas nozzle 30 such that the second gas path 21 is defined between the third gas nozzle 30 and the second gas nozzle 20. A second gas to be supplied into the second gas path 21 is sprayed to the plasma flame from outside of the plasma flame to rapidly restrict the plasma flame to thereby further thin the droplets and provide a sufficient speed to the droplets to ensure the droplets to be sprayed onto a target. The second gas comprises compressed air or a carbon dioxide gas, for instance.

It is preferable that the first gas has a flow rate in the range of 50 to 120 (liters/minute) both inclusive in order to control a temperature, a speed and a potential of the plasma flame by varying the flow rate.

If the first gas had a flow rate smaller than 50 (liters/minute), the plasma flame would have a reduced speed with the result of deterioration in quality of a sprayed coating. If the first gas had a flow rate greater than 120 (liters/minute), the plasma flame would have an increased speed and a temperature of the plasma flame would lower with the result of deterioration in quality of a sprayed coating.

It is preferable that the second gas has a flow rate in the range of 250 to 500 (liters/minute) in order to be sprayed to the plasma flame from outside of the plasma flame for rapidly restricting the plasma flame to thereby further thin the droplets and provide a sufficient speed to the droplets.

If the second gas had a flow rate smaller than 250 (liters/minute), the second gas could not thin the droplets, and further, could not provide a sufficient speed to the droplets with the result of deterioration in quality of a sprayed coating. If the second gas had a flow rate greater than 500 (liters/minute), the droplets would be excessively thinned, and hence, excessively cooled, with the result of deterioration in quality of a sprayed coating.

It is preferable that the third gas has a flow rate in the range of 20% to 50% both inclusive in volume relative to a flow rate of the first gas in order to absorb heat from the plasma flame to thereby generate a high-temperature gas jet externally of the plasma flame derived from the first gas, and further, in the range of 5% to 10% both inclusive in volume relative to a flow rate of the second gas in order to prevent turbulence of the plasma flame and dispersing of the third gas both caused by the spraying of the second gas. In order to effectively prevent turbulence of the plasma flame and dispersing of the third gas both caused by the spraying of the second gas, it is preferable to vary a flow rate of the third gas in synchronization with the fluctuation of a flow rate of the second gas, specifically, it is preferable that a flow rate of the third gas is decreased when a flow rate of the second gas decreases, and a flow rate of the third gas is increased when a flow rate of the second gas increases.

If the third gas had a flow rate smaller than 20% of a flow rate of the first gas or smaller than 5% of a flow rate of the second gas, the advantage caused by spraying the third gas that both turbulence of the plasma flame and gas-dispersing are prevented is reduced with the result that it is difficult to enhance a quality of a sprayed coating.

If the third gas had a flow rate greater than 50% of a flow rate of the first gas or greater than 10% of a flow rate of the second gas, the third gas would generate intensive jet, and accordingly, it is difficult for the third gas to absorb heat from the plasma flame therein to thereby generate a high-temperature gas jet. This results in that the advantage that both turbulence of the plasma flame and gas-dispersing are prevented cannot be sufficiently accomplished, and thus, it is difficult to enhance a quality of a sprayed coating.

The wire path 50 includes a first wire path 51*a* having a wire exit 51*b* formed in the vicinity of the nozzle opening 22 of the second gas nozzle 20, and a second wire path 52*a* through which the wire W is supplied at a predetermined angle relative to the first wire path 51*a*.

The wire path 50 causes the wire W to bend within elastic limit thereof by means of the first wire path 51*a* and the second wire path 52*a*.

As illustrated in FIG. 4, the first wire path 51*a* has a substantially rectangular cross-section extending in a direction in which the plasma flame extends, and is formed by linearly passing through a first wire guide 51 disposed outside of the second gas nozzle 20. Similarly, the second wire path 52*a* has a substantially rectangular cross-section extending in a direction in which the plasma flame extends, and is formed by linearly passing through a second wire guide 52 disposed away from the first wire path 51*a*.

A length “a” of a longer side of the first wire path 51*a* is designed to be longer than a diameter “d” of the wire W by 10% to 95% both inclusive. A length “b” of a shorter side of the first wire path 51*a* is designed to be longer than a diameter “d” of the wire W by 3% to 10% only 3% inclusive.

In the current embodiment, the wire W has a diameter of 1.6 mm, a longer side of the first wire path 51*a* has a length “a” longer than a diameter “d” of the wire W by about 0.2 to about 1.5 mm, and a shorter side of the first wire path 51*a* has a length “b” longer than a diameter “d” of the wire W by about 0.05 to about 0.15 mm. The longer and shorter sides of the second wire path 52*a* are designed to have the same lengths as those of the first wire path 51*a*.

It should be noted that the substantially rectangular cross-sections of both the first wire path 51*a* and the second wire path 52*a* may be chamfered or rounded at corners unless the corners make contact with the wire W. Accordingly, only a force oriented perpendicular to the longer or shorter side of both the first wire path 51*a* and the second wire path 52*a* acts on the wire W in the current embodiment in the first wire path 51*a* and the second wire path 52*a*.

An inclination angle θ formed between the first wire path 51*a* and the second wire path 52*a* is defined as an angle formed between a central axis of the first wire path 51*a* and a central axis of the second wire path 52*a*. In the current embodiment, the inclination angle θ is set in the range of about 1 to about 5 degrees both inclusive.

The second wire guide 52 through which the second wire path 52*a* passes is disposed away from the first wire path 51*a* by a space “c”. In the current embodiment, the space “c” is set in the range of about 3 to about 10 mm both inclusive.

In the plasma spraying torch 2 in the current embodiment, as mentioned above, since the first wire path 51*a* and the second wire path 52*a* are spaced away from each other by a space “c”, the first wire path 51*a* and the second wire path 52*a*, both of which are linear, cooperate with each other to artificially define the curved wire path 50 to thereby cause the wire W to bend within elastic limit.

Though the first wire path 51*a* and the second wire path 52*a* are designed linear in the current embodiment, they may be designed curved.

The battery 4 is electrically connected at an anode thereof with the first wire guide 51, and hence, is indirectly electrically connected with the wire W inserted into the first wire path 51*a* formed through the first wire guide 51. The battery 4 is electrically connected at a cathode thereof with the cathode 40. The battery 4 may be directly electrically connected at an anode thereof with the wire W.

In the plasma spraying apparatus 1 having the above-mentioned structure, when the wire W wound around the wire reel 5 is fed to the plasma spraying torch 2 through the wire feeder 7, the original deformation of the wire W, that is, the intensive characteristic by which the wire W tends to be curled, is removed by means of the wire straightener 6, and thus, the wire W is straightened to a slightly curled condition.

Then, the wire W is fed to the wire path 50 through the wire-feeding tube 8. In the wire path 50, only a force oriented perpendicular to a longer side or a shorter side of both the first wire path 51a and the second wire path 52a acts on the wire W, and thus, as illustrated in FIG. 5, the wire W is caused to bend within elastic limit thereof in a direction in which the plasma flame F extends.

Since both the first wire path 51a and the second wire path 52a are designed to have a rectangular cross-section having a longer side extending in a direction in which the plasma flame F extends, the original deformation of the wire W is released in a direction in which the plasma flame F extends. In particular, in the current embodiment, since the shorter side of the first wire path 51a and the second wire path 52a is designed to have a length "b" greater than a diameter "d" of the wire W by X % ($3 \leq X < 10$), the original deformation of the wire W is not released in a direction perpendicular to a direction in which the plasma flame F extends. Accordingly, even if a tip end of the wire W were slightly shifted in a direction in which the plasma flame F extends, the tip end is prohibited from shifting in a direction perpendicular to a direction in which the plasma flame F extends, and thus, it is ensured that the tip end of the wire W is disposed on an axis of the plasma flame F.

Figure 6:
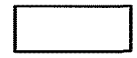
FIG. 6 shows a relation between a cross-section of the wire path and a direction in which a force acts on the wire.
Figure 6:
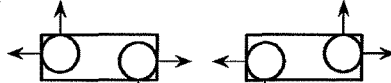
Figure 6:
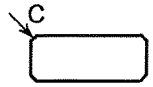
Figure 6:
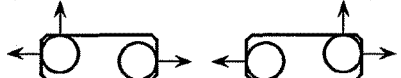
Figure 6:
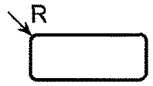
Figure 6:
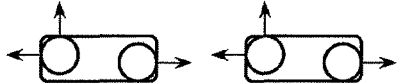
Figure 6:
Figure 6:
Figure 6:
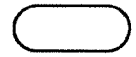
Figure 6:

FIG. 6 shows a relation between a cross-section of the wire path 50 and a direction in which a force acts on the wire W.

In FIG. 6, the cross-section A indicates a rectangular cross-section, the cross-section B indicates a rectangular cross-section which is chamfered at corners such that the wire W does not make contact with the chamfered corners, and the cross-section C indicates a rectangular cross-section which is rounded at corners such that the wire W does not make contact with the rounded corners.

In these cross-sections A, B and C, when the wire W makes contact with not only a longer side, but also a shorter side, only a force oriented perpendicular to the longer side and shorter side acts on the wire W.

Since it is not possible to completely straighten the wire W even by the wire straightener 7, the wire W unavoidably has the original deformation, specifically, a characteristic of curling. Furthermore, the wire-feeding tube 8 is varied into various shapes in dependence on a position of the plasma spraying torch 2 in assembling the plasma spraying apparatus 1, and hence, cannot keep a uniform shape. Thus, when the wire W having the original deformation is being fed through the wire-feeding tube 8 which is not capable of keeping a uniform shape, a bending force and/or a torsion force act on the wire W in dependence on a shape of the wire-feeding tube 8. The wire W randomly bends like a spring in elastic limit thereof by such forces, and is fed in meandering condition through the wire-feeding tube 8 in a route at which the forces are stabilized.

While the wire W is being fed in the wire path 50, when the wire W makes contact with a shorter side of the above-mentioned cross-section A, B or C, a force oriented perpendicular to a shorter side, that is, a force oriented in parallel with a direction (hereinafter, referred to as "direction X") in which the plasma flame F extends acts on the wire W, and hence, the original deformation is released in the direction X. If a force oriented in a direction (hereinafter, referred to as "direction Y") perpendicular to the direction X acts on the wire W while the wire W makes contact only with a shorter side, the wire W randomly moves by spaces formed in the length "b", and makes contact with a longer side, however, in which case, since a force oriented in a direction perpendicular to a longer side, that is, in the direction Y acts on the wire W, the wire W is able to stably keep its position.

In contrast, when the wire W makes contact with a curved surface of a circular cross-section or an elongated circular cross-section, since a force oriented perpendicular to the curved surface, the wire W can freely move along the curved surface. In particular, when a torsion force acts on the wire W, the wire W freely rotates along a curved surface, and hence, the wire W is not prevented from being distorted. Thus, a direction in which a torsion force acts on the wire W is not fixed, and hence, a position of the wire W is not fixed.

As mentioned above, the plasma spraying apparatus 1 in accordance with the present embodiment makes it possible to stably supply the wire W at its tip end to a center of the plasma flame F. The first gas sprayed through the first gas path 11 is turned into the plasma flame F by both the wire W indirectly electrically connected to an anode of the battery 4 through the first wire guide 51, and the cathode 40 electrically connected to a cathode of the battery 4. The plasma flame F melts the wire W into droplets D, and sprays the droplets D. The droplets D are reduced in size and further accelerated by the second gas sprayed through the second gas path 21 and leaving the second gas nozzle 20, and sprayed onto the target T to thereby form the sprayed coating S.

In the plasma spraying apparatus 1 in accordance with the present embodiment, a third gas flow sprayed through the third gas path 31 defined between the first gas path 11 and the second gas path 21 absorbs heat from the plasma flame F to thereby generate a high-temperature gas jet G. The high-temperature gas jet G drastically restricts the second gas sprayed outside of the gas jet G to thereby weaken turbulence generated externally of the plasma flame F, resulting in that a gas of the plasma flame F is prevented from dispersing, and surfaces of the droplets D are reduced in being oxidized. Thus, it is possible to form the sprayed coating S which is difficult to be oxidized, onto the target T.

In the plasma spraying apparatus 1 in accordance with the present embodiment, since the third absorbs heat from the plasma flame F to generate a high-temperature gas jet externally of the plasma flame F, and prevents turbulence in the plasma flame F which is generated when the second gas is rapidly restricted, it is possible to form a sprayed coating S which is difficult to be oxidized, even if compressed air is employed as the first gas.

In the case that the third gas comprises an inert gas such as a nitrogen gas or an argon gas, as mentioned above, the third gas drastically restricts the second gas to thereby avoid turbulence generated externally of the plasma flame F, and further generates a high-temperature inert gas jet which absorbed heat from the plasma flame F, externally of the plasma flame F. Thus, particles comprising the droplet D are reduced in size with components of the particles being prevented from varying by virtue of the high-temperature inert gas jet, and further, accelerated, resulting in that the particles are protected from being oxidized by the second gas. Thus, it is possible to form the sprayed coating S which is further difficult to be oxidized.

Though both the first wire path 51a and the second wire path 52a in the present embodiment are designed to have a substantially rectangular cross-section extending in a direction in which the plasma flame F extends, one of them may be designed to have such a cross-section, in which case, the original deformation of the wire W can be released in a direction in which the plasma flame F extends, by means of the first wire path 51*a* or the second wire path 52*a* having a substantially rectangular cross-section extending in a direction in which the plasma flame F extends, to thereby supply a tip end of the wire W to a center of the plasma flame F.

EXAMPLE

There was carried out the comparison test for two cases, in one of which both compressed air and a nitrogen gas as an inert gas were used as the third gas, and in the other of which the third gas was not used.

In the Example, aluminum alloy was employed for spraying onto a target, and a self potential of a sprayed coating was measured as an index showing how much degree the sprayed coating was oxidized, in order to confirm whether the third gas provides advantages. Furthermore, as an attempt to reduce running costs, cheap compressed air was used as the first gas, the second gas, and the third gas in the formation of a sprayed coating, and a self potential of the sprayed coating was measured for confirming whether the third gas provides advantages.

Figure 7:
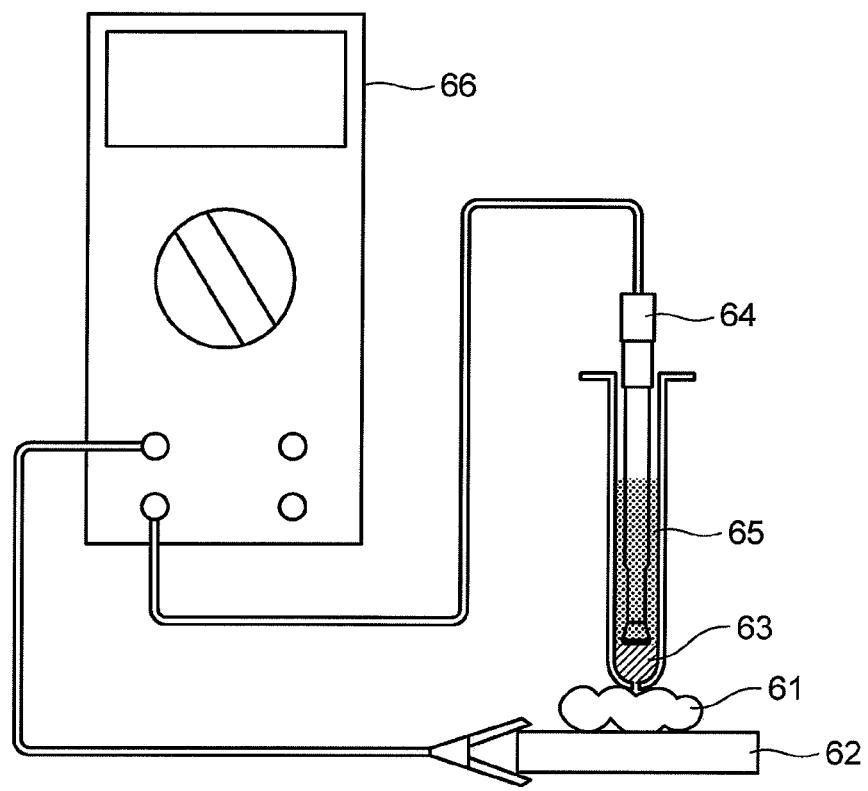
FIG. 7 is a schematic view of an apparatus for measuring a self potential.

FIG. 7 is a schematic view of an apparatus for measuring a self potential of a sprayed coating.

As illustrated in FIG. 7, 5 weight % NaCl environment (specifically, a cotton 61 into which 5 weight % NaCl aqueous solution permeated) was generated at a surface of a test piece (a sprayed coating) 62 through the use of salt bridge 63 composed of KCl-saturated solution and agar. Using an electrode 64 composed of saturated silver chloride as a reference electrode, and soaked into KCl-saturated solution 65, a self potential of the test piece 62 was measured by means of a tester 66. In order to make a self potential stable, a self potential was measured when 600 seconds passed after starting the measurement.

Table 1 shows the results of the comparison test, and Table 2 shows the self potentials of the test piece having been measured under the conditions shown in Table 1.

TABLE 1

| Used gas as the third gas | Potential of a sprayed coating |
| --- | --- |
| Nitrogen gas is used as the third gas | −1150 (−1196 to −1106) mV |
| Compressed air is used as the third gas | −1063 (−1080 to −1032) mV |
| First to third gases are all composed of compressed air | −1052 (−1069 to −1020) mV |
| Third gas is not used (prior art) | −997 (−1019 to −980) mV |
| Typical conditions for spraying | |

Flow rate of the first gas (nitrogen gas) = 70 (liter/minute)
Flow rate of the second gas (compressed air) = 400 (liter/minute)
Flow rate of the third gas (compressed air and nitrogen gas) = 30 (liter/minute)
Thickness of coating: 100 (±20) micrometers
Generated voltage: 130 (±5) (V)
Generated current: 60 (±3) (A)
Materials of which a wire is composed: 5% Mg—95% Al alloy (mass ratio)

TABLE 2

Results of the self potential measurements under the various conditions

| | First Gas | Flow rate of First gas | Second gas | Flow rate of Second gas | Third gas | Flow rate of Third gas | Potential of coating | Average potential of coatings | Remarks | |
| --- | --- | --- | --- | --- | --- | --- | --- | --- | --- | --- |
| 1-1 | $N_2$ | 70 | Air | 400 | $N_2$ | 30 | −1194 | −1150 | | A |
| | | 120 | | 500 | | 25 | −1142 | | | |
| | | 70 | | 400 | | 20 | −1196 | | Lower limit | |
| | | 70 | | 400 | | 35 | −1106 | | Upper limit | |
| | | 100 | | 250 | | 22 | −1114 | | | |
| 1-2 | $N_2$ | 100 | Air | 500 | $N_2$ | 20 | −1005 | | Out of range | B |
| | | 70 | | 400 | | 40 | −921 | | Out of range | C |
| | | 50 | | 250 | | 35 | −894 | | Out of range | D |
| 2-1 | $N_2$ | 70 | Air | 400 | Air | 30 | −1080 | −1063 | | E |
| | | 120 | | 500 | | 40 | −1074 | | | |
| | | 70 | | 400 | | 20 | −1065 | | Lower limit | |
| | | 70 | | 400 | | 35 | −1032 | | Upper limit | |
| | | 100 | | 250 | | 22 | −1062 | | | |
| 2-2 | $N_2$ | 100 | Air | 500 | Air | 20 | −924 | | Out of range | F |
| | | 70 | | 400 | | 40 | −876 | | Out of range | G |
| | | 50 | | 250 | | 35 | −894 | | Out of range | H |
| 3 | Air | 70 | Air | 400 | Air | 30 | −1069 | −1052 | | I |
| | | 120 | | 500 | | 40 | −1063 | | | |
| | | 70 | | 400 | | 20 | −1052 | | Lower limit | |
| | | 70 | | 400 | | 35 | −1055 | | Upper limit | |
| | | 100 | | 250 | | 22 | −1020 | | | |
| 4 | $N_2$ | 70 | Air | 400 | None | 0 | −984 | −997 | | J |
| | | 120 | | 500 | | 0 | −997 | | | |

TABLE 2-continued

Results of the self potential measurements under the various conditions

| First Gas | Flow rate of First gas | Second gas | Flow rate of Second gas | Third gas | Flow rate of Third gas | Potential of coating | Average potential of coatings | Remarks |
|---|---|---|---|---|---|---|---|---|
| | 100 | | 400 | | 0 | −1019 | | |
| | 70 | | 500 | | 0 | −1005 | | |
| | 100 | | 250 | | 0 | −980 | | |

Remarks-A: Shield performance by the third gas (nitrogen gas)
Remarks-B: Smaller than 5% of a flow rate of the second gas
Remarks-C: Greater than 50% of a flow rate of the first gas
Remarks-D: Beyond the upper limit
Remarks-E: Restriction by the third gas (air)
Remarks-F: Smaller than 5% of a flow rate of the second gas
Remarks-G: Greater than 50% of a flow rate of the first gas
Remarks-H: Beyond the upper limit
Remarks-I: Restriction by the third gas in the case that the first to third gases are all composed of air
Remarks-J: No third gas (prior art)

As indicated in Table 1, a sprayed coating formed under the condition that the third gas was composed of compressed air had a self potential smaller by about 60 mV than a self potential of a sprayed coating formed under the condition that there was not used the third gas. Furthermore, a sprayed coating formed under the condition that the third gas was composed of a nitrogen gas as an inert gas had a self potential smaller by about 150 mV than a self potential of a sprayed coating formed under the condition that there was not used the third gas. A sprayed coating formed under the condition that the first, second and third gases were all composed of compressed air as a cheap gas had a self potential smaller by about 50 mV than a self potential of a sprayed coating formed under the condition that there was not used the third gas. Thus, it was confirmed that the use of the third gas could reduce oxidization of inside of a sprayed coating.

INDUSTRIAL APPLICABILITY

The plasma spraying apparatus and the method of forming a sprayed coating onto a target both in accordance with the present invention are useful for forming an anti-corrosive sprayed coating on a surface of a steel structure.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2010-276142 filed on Dec. 10, 2010 including specification, claims, drawings and summary is incorporated herein by reference in its entirety.

What is claimed is:
1. A plasma spraying apparatus comprising:
a cathode;
a first gas nozzle surrounding a head of said cathode therewith to form a first gas path between said cathode and said first gas nozzle;
a second gas nozzle surrounding said first gas nozzle therewith to form a second gas path between said first gas nozzle and said second gas nozzle; and
a third gas nozzle disposed between said first gas nozzle and said second gas nozzle to define a third gas path between said first gas path and said second gas path,
wherein a first gas sprayed through said first gas nozzle is turned into plasma flame by arc generated between said cathode and a wire disposed in front of a nozzle opening of said second gas nozzle, said wire is molten at a distal end thereof into droplets by said plasma flame, and said droplets are sprayed onto a target by means of both said plasma flame and a second gas sprayed through said second gas nozzle, and
a third gas sprayed through said third gas nozzle absorbs heat from said plasma flame to thereby turn into a high-temperature gas flow externally of said plasma flame.

2. The plasma spraying apparatus as set forth in claim 1, wherein said second gas nozzle is formed with a wire path through which a wire is inserted such that a distal end of said wire is disposed in front of a nozzle opening of said second gas nozzle.

3. The plasma spraying apparatus as set forth in claim 1, wherein said third gas has a flow rate in the range of 20% to 50% both inclusive in volume relative to a flow rate of said first gas, and further, 5% to 10% both inclusive in volume relative to a flow rate of said second gas.

4. The plasma spraying apparatus as set forth in claim 1, wherein said third gas comprises compressed air.

5. The plasma spraying apparatus as set forth in claim 1, wherein said third gas comprises a carbon dioxide gas.

6. The plasma spraying apparatus as set forth in claim 1, wherein said third gas comprises an inert gas.

7. The plasma spraying apparatus as set forth in claim 1, wherein said first gas comprises compressed air.

8. A method of forming a sprayed coating onto a target, comprising:
setting a wire;
turning a first gas into plasma flame and causing said plasma flame to flow towards said wire such that a distal end of said wire is molten into droplets;
causing a second gas to flow such that said droplets are sprayed onto a target by said second gas; and
causing a third gas to flow between said first gas and said second gas to absorb heat from said plasma flame to thereby turn into a high-temperature gas flow externally of said plasma flame.

9. The method as set forth in claim 8, wherein said third gas has a flow rate in the range of 20% to 50% both inclusive in volume relative to a flow rate of said first gas, and further, 5% to 10% both inclusive in volume relative to a flow rate of said second gas.

10. The method as set forth in claim 8, wherein said third gas comprises compressed air.

11. The method as set forth in claim 8, wherein said third gas comprises a carbon dioxide gas.

12. The method as set forth in claim 8, wherein said third gas comprises an inert gas.

13. The method as set forth in claim 8, wherein said first gas comprises compressed air.

* * * * *